(12) United States Patent
Nightingale

(10) Patent No.: US 6,989,492 B2
(45) Date of Patent: Jan. 24, 2006

(54) INVERTED STRAIN RELIEF

(75) Inventor: Mark W. Nightingale, Washougal, WA (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 10/856,291

(22) Filed: May 27, 2004

(65) Prior Publication Data

US 2005/0263317 A1 Dec. 1, 2005

(51) Int. Cl.
    H02G 3/00 (2006.01)
(52) U.S. Cl. .................. 174/100; 174/65 G; 174/74 R; 385/135
(58) Field of Classification Search ................ 174/100, 174/74 R, 74 A, 84 R, 135, 93, 65 G, 65 R; 385/135, 86; 248/49
    See application file for complete search history.

(56) References Cited

U.S. PATENT DOCUMENTS

| | | | |
|---|---|---|---|
| 6,051,795 A | 4/2000 | Fisher et al. | |
| 6,119,305 A | 9/2000 | Loveall et al. | |
| 6,489,568 B2 | 12/2002 | Arthur | |
| 6,621,005 B1 * | 9/2003 | Lovec et al. | .............. 174/74 R |
| 6,704,670 B2 | 3/2004 | McTigue | |

* cited by examiner

*Primary Examiner*—Dhiru R. Patel
(74) *Attorney, Agent, or Firm*—William K. Bucher

(57) ABSTRACT

An inverted strain relief for receiving a coaxial cable has a housing with a bore therethrough defining first and second apertures in opposing surfaces of the housing. The bore surface is defined by at least a first radius scribing an arc from the perimeter of the first aperture to the second aperture. A smaller second radius scribes an arc tangential to the arc of the first radius over a portion of the exterior surface of the housing. Alternately, the first and second radii may define the surface of the bore with the second radius extending over a portion of the exterior surface of the housing. The bore in the housing is definable by an additional aperture formed adjacent to the first aperture. The surface of the bore is defined by at least the first radius extending from the perimeters of the adjacent apertures.

10 Claims, 8 Drawing Sheets

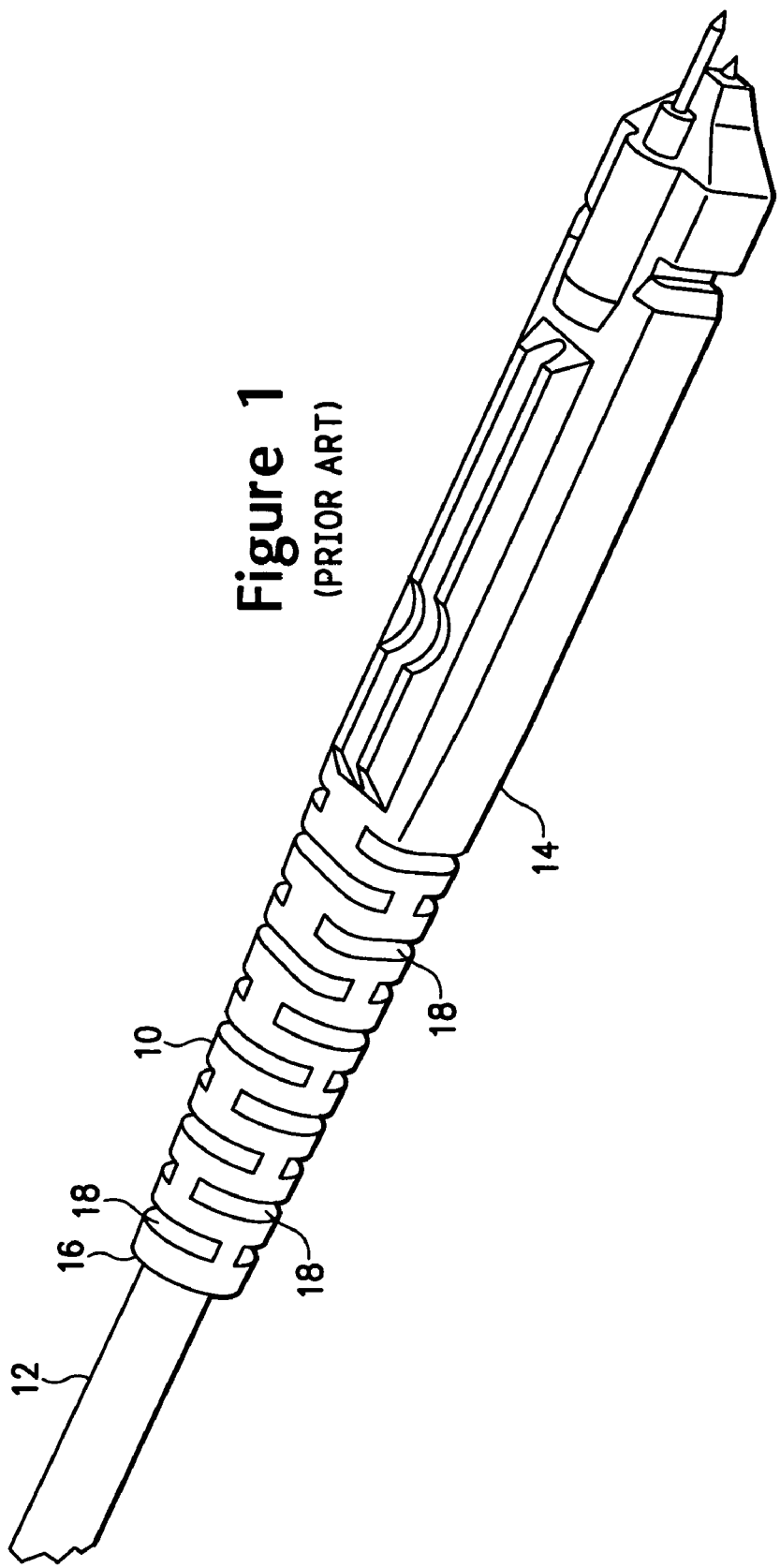

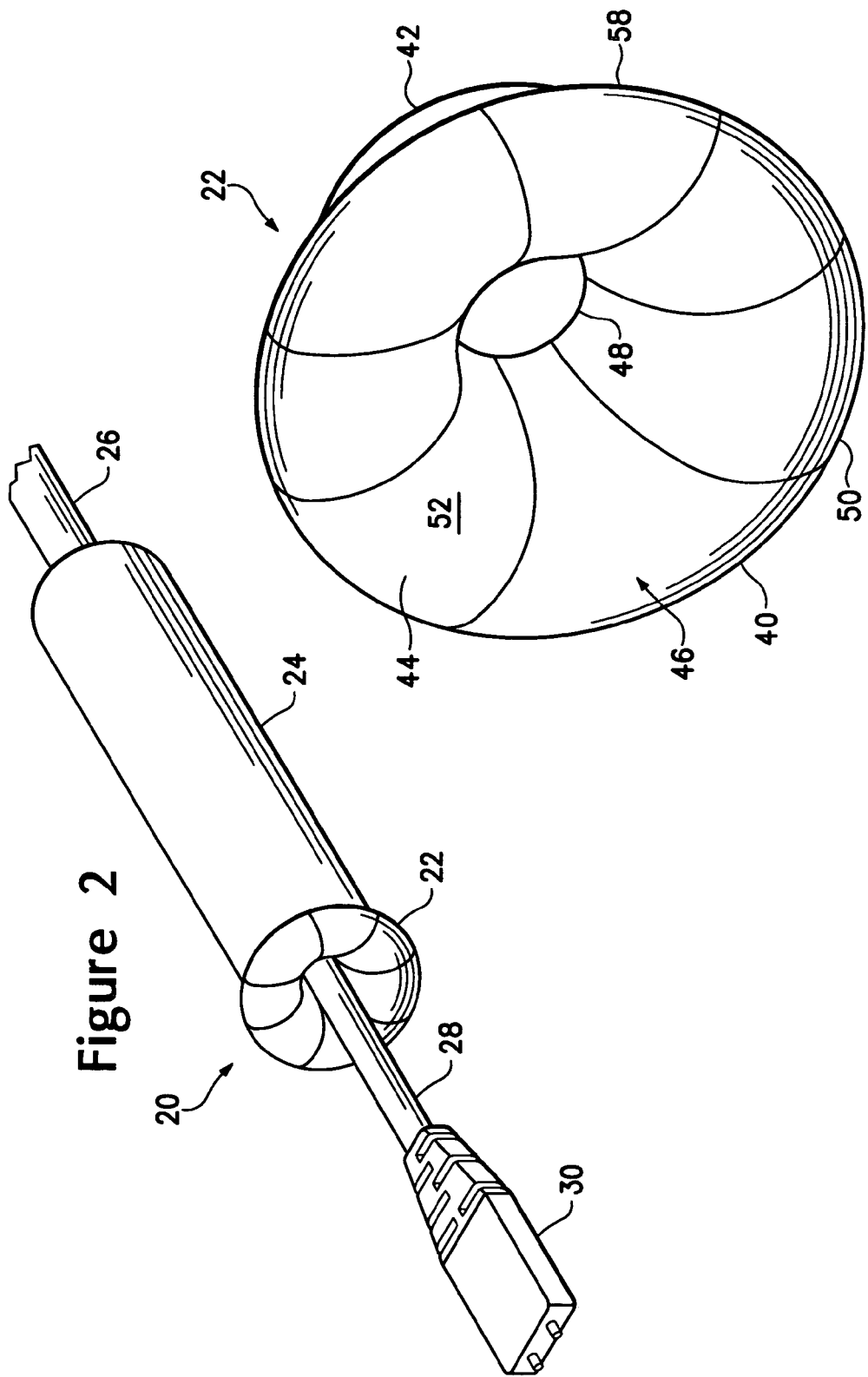

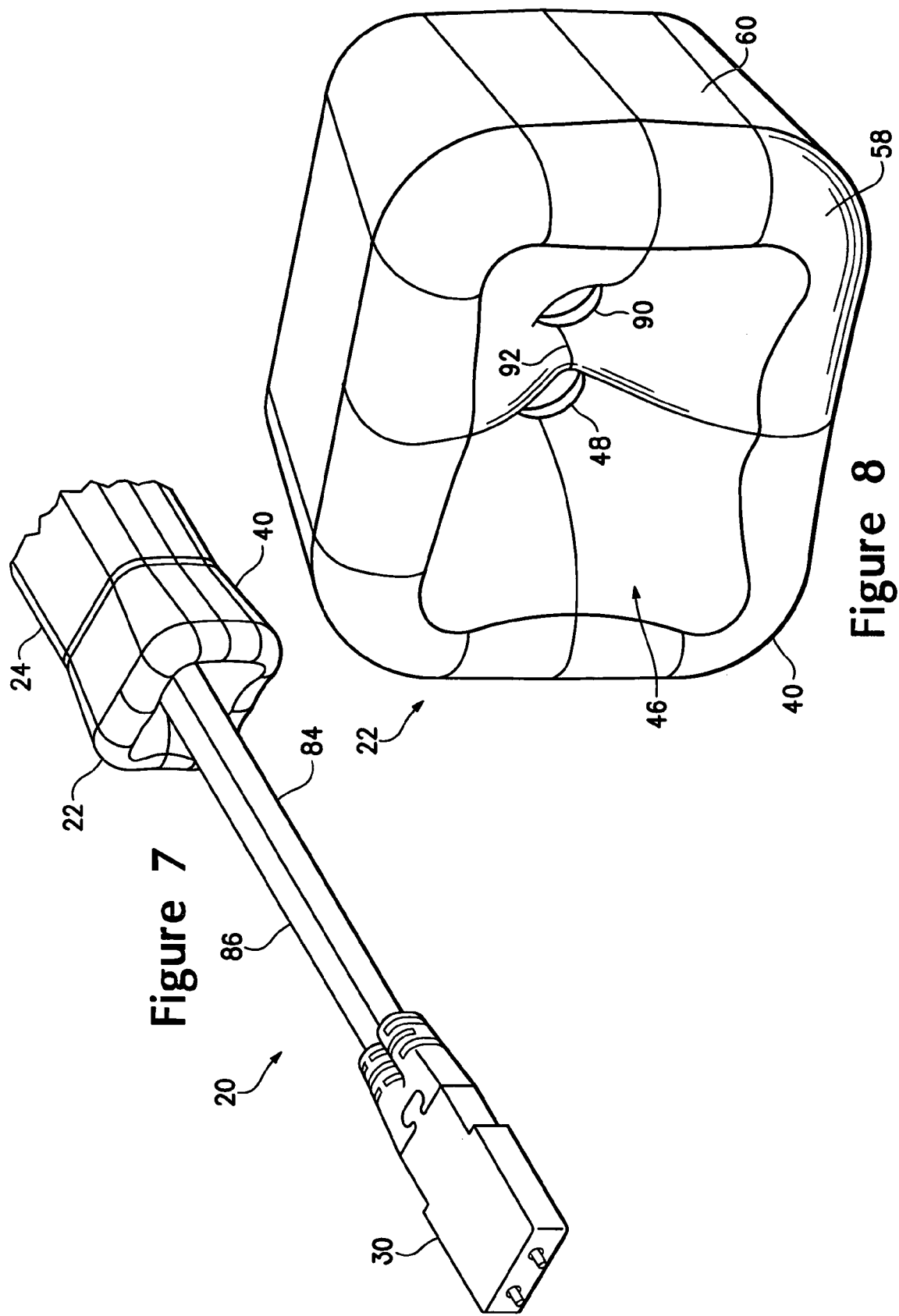

INVERTED STRAIN RELIEF

BACKGROUND OF THE INVENTION

The present invention relates generally to strain reliefs and more particularly to an inverted strain relief for electrical cables.

Strain reliefs for coaxial electrical cables are generally made of a thermo-plastic material, such as SANTO-PRENE®. FIG. 1 illustrates a strain relief 10 formed around a coaxial cable 12 that coupled to a measurement probe 14. The strain relief 10 encircles the cable 12 and tapers from the connection of the coaxial cable 12 to the measurement probe 14 or other type of a device, such as a probe control unit (formally known as a termination box) or the like, to a point 16 along the length of the coaxial cable 12. The strain relief 10 has a pattern of lateral slots 18 formed therein that allows the cable 12 to bend or flex. The length of the strain relief 10 is a function of the coaxial cable diameter and its susceptibility to damage from excessive bending. The ratio of the strain relief length over the coaxial cable diameter increases as the coaxial cable diameter decreases. This results in a smaller diameter coaxial cable generally requiring a longer strain relief. For example, a 0.184 inch diameter coaxial cable 12 has a strain relief length of approximately 1.25 inches.

As the bandwidth of measurement instruments, such as oscilloscopes and the like, increases, there is a corresponding need to produce measurement probe having equal or greater bandwidths. A major difficulty in designing very wide bandwidth measurement probes having bandwidths of 5 GHz and greater is the effects of capacitance and inductance of the probing tip or tips. One solution to this problem is to separate the probing tips from the active circuitry in the probing head of the measurement probe. U.S. Pat. No. 6,704,670 describes a wideband active probing system where the probing tip or tips of the probe are separable from a probe amplifier unit. One or more probe cables are connected to a probe tip unit and selectively connected to the probe amplifier unit for conveying signals received by a probe unit. The probe cables are typically connected to the probe amplifier unit by probe cable connectors which may include strain relief devices. Various types of probe tip units may be connected to the probe amplifier unit. The probe tip unit may contain circuitry ranging from conductor traces to various resistive, capacitive, and/or other electronic elements. An advantage of such a probe design is that it allows the placement of the substantially smaller probe tip unit difficult to reach contacts on a device under test instead of a larger measurement probe containing probe amplifier circuitry.

One requirement for such a probe design is to minimize the length of the probe cables. The longer the probe cable length, the lower the overall bandwidth of the measurement probe. Preferably, the overall cable length of such cables in this type of probing application should be in the range of two inches for an 8 GHZ measurement probe. This in turn, limits the type of strain relief that can be put on the cable. Using a 0.070 inch diameter cable with a standard stain relief as shown in FIG. 1 would require the cable to be longer than the optimum two inch cable length. What is needed is a new type of strain relief for measurement probing applications that does not require a long coaxial cable strain relief.

U.S. Pat. No. 6,489,568 describes a wire protection grommet for installation in a wire pull opening extending between a preset and the cell of a cellular raceway. The grommet includes a central opening extending between the preset and the raceway cell. The central opening has a proximal end that is flared outwardly, as is the inner surface of the central opening. The central opening tapers down to opposing parallel surfaces at the distal end, which is disposed in wire pull opening in the preset. The flared construction gives the proximal end of the central opening a smooth radiused surface that functions as a wire pull strength relief.

U.S. Pat. No. 6,051,795 describes a grommet that is positionable in a panel hole to prevent a fire from spreading from one panel side to the other. The grommet has a inner peripheral surface defining a hollow central opening with a radius less than that of a cable received in the opening. The inner peripheral surface is outwardly radiused in opposing directions from the central opening. This allows the cable to be shifted from a concentric relationship in the hole to a non-concentric relationship.

SUMMARY OF THE INVENTION

Accordingly, the present invention is an inverted strain relief for receiving a coaxial cable having a housing with a bore therethrough intersecting opposing surfaces of the housing defining first and second apertures in the opposing surfaces. The bore surface is defined by first and second radii with the first radius being greater than the second radius. The first radius extends from the perimeter of the first aperture and scribes a first arc. The second radius scribing a second arc that is tangential to the arc of the first radius. The surface of the bore provides the strain relief for the coaxial cable. The housing has an exterior surface wherein the second radius may scribe a arcuate surface on the exterior surface extending from the second aperture. The total arc scribed by the first and second radii does not exceeding 360 degrees. The bore and arcuate exterior surfaces scribed by the first and second radii provide the strain relief for the coaxial cable. The housing may be substantially circular with the arc scribed by the first radius being approximately sixty degrees. For housing having a substantially rectangular form, the arc scribed by the first radius ranges from approximately sixty degrees to eighty degrees.

In a further embodiment of inverted strain relief, the first radius scribes an arc extending from the perimeter of the first aperture to the perimeter of the second aperture and a second radius scribes an arc from the second aperture over an exterior surface of the housing where the arc of the first radius is tangential to the arc of the second radius. The total arc scribed by the first and second radii does not exceed 360 degrees and the bore and arcuate exterior surfaces scribed by the first and second radii provides the strain relief for the coaxial cable.

The bore in the housing is definable by an additional aperture formed adjacent to the first aperture. The surface of the bore is definable by either the first radius extending from the perimeters of the adjacent apertures to the second aperture or the first radius extending from the perimeters of the adjacent apertures and transitioning to the second radius such the surface of the bore provides strain relief for coaxial cables extending through the bore and passing through the adjacent apertures.

The objects, advantages and novel features of the present invention are apparent from the following detailed description when read in conjunction with appended claims and attached drawings.

BRIEF DESCRIPTION OF THE DRAWINGS

FIG. 1 is a perspective view of a strain relief for a coaxial cable in the prior art.

FIG. 2 is a perspective view of a measurement probing system incorporating a first embodiment of the inverted strain relief according to the present invention.

FIG. 3 is a perspective view illustrating the first embodiment of the inverted strain relief according to the present invention.

FIG. 7 is a perspective view of another embodiment of the inverted strain relief of the present invention incorporated in a differential measurement probe.

FIG. 8 is a perspective view of the invented strain relief illustrated in FIG. 7.

DETAILED DESCRIPTION OF THE PREFERRED EMBODIMENT

Figure 4:
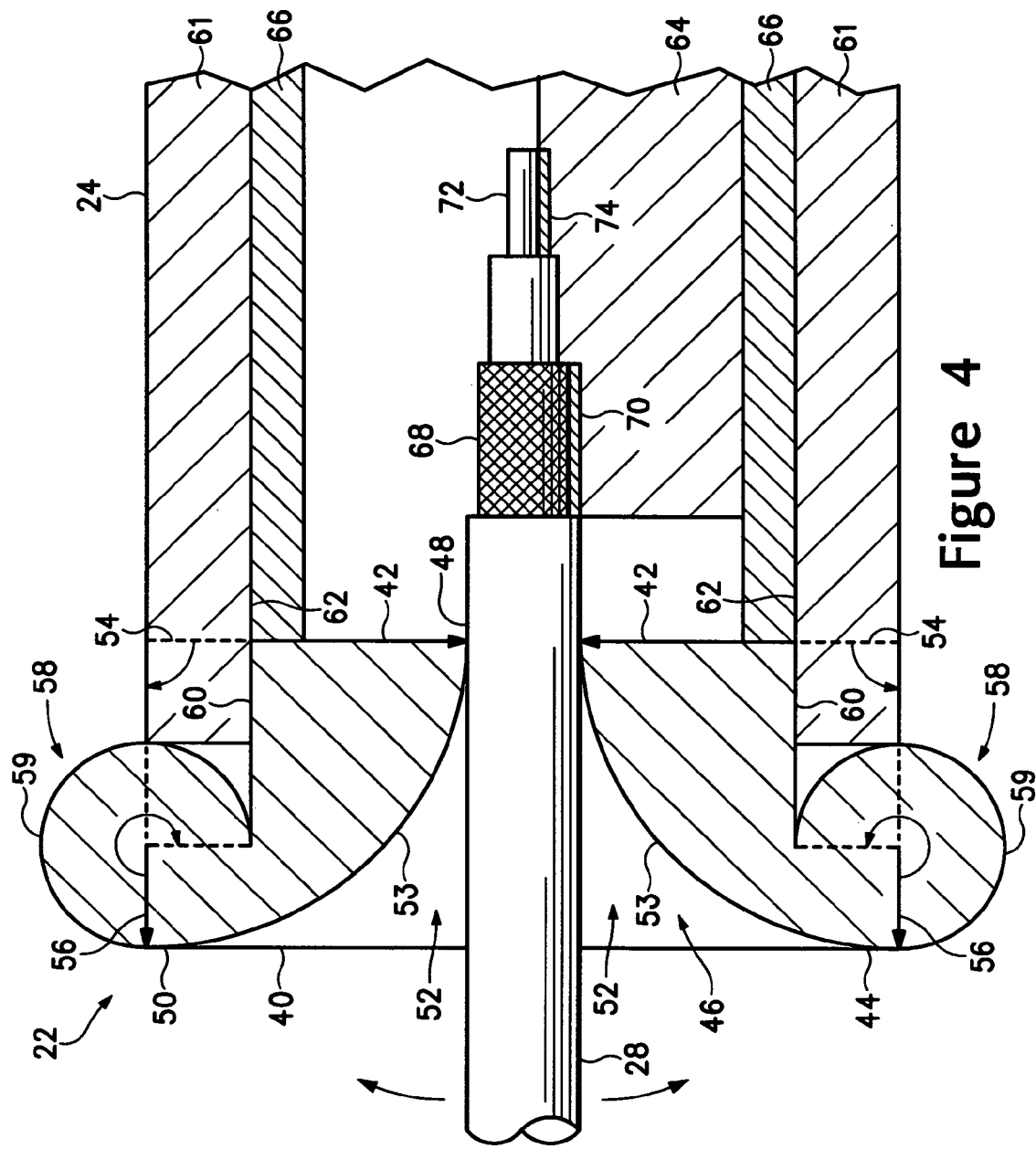
FIG. 4 is sectional view of the of the inverted strain relief of FIG. 3.

Referring to FIG. 2, there is shown a measurement probing system 20 incorporating a first embodiment of the inverted strain relief 22 of the present invention. The measurement probing system 20 includes a probe body 24 that is electrically coupled to a measurement test instrument (not shown), such as an oscilloscope or the like, via a coaxial cable 26. The coaxial cable 26 also contains power and signal lines that provide electrical power to active circuitry in the probe body 24 and communication signals to and from the probe body 24 for controlling the active circuitry. A coaxial cable 28 extends from the probe body 24 through the inverted strain relief 22 and is coupled to a probing tip member 30 for probing a device under test. In the embodiment shown, the probe body 24 has an elongate circular shape with the inverted strain relief 22 having a generally circular form. The circular shape of the probe body 24 and the inverted stain relief 22 are by example only and other shapes are contemplated for the probe body 24 and the inverted strain relief 22, examples of which will be described in relation to further embodiment described below.

FIGS. 3 and 4 show respective perspective and side sectional views of the first embodiment of the inverted strain relief 22. The inverted strain relief has a housing 40 having opposing surfaces 42 and 44 with a bore 46 extending through the housing and intersecting the opposing surfaces 42 and 44 forming apertures 48 and 50. The surface 52 of the bore 46 is defined by an arc 53 of at least a first radius 54 extending from the perimeter of the aperture 48 in the surface 42 of the housing 40 to the other aperture 50 in surface 44 of the housing 40. The arc 53 of the first radius 54 results in the bore 46 having a generally funnel shape. A second radius 56 extends from the first radius 54 where the first radius interests the housing surface 44. The arc 59 scribed by the second radius 56 is tangential to the arc 53 scribed by the first radius 54. The second radius 56 defines an arcuate outer surface 58 portion of the housing 40 with the combined arcs 53, 59 of the first and second radii 54 and 56 not exceeding 360 degrees. A generally flat surface 60 extends from the acuate outer surface 58 to the opposing surface 44 of the housing. The intersection of the flat surface 60 with the arcuate surface 58 may occur along substantially any portion of the arcuate surface 58. Preferably, the flat surface 60 intersects the arcuate surface 58 at a minimum of 180 degrees of combined arc 53, 59 of the first and second radii 54 and 56.

The housing 40 is disposed in the end of the probe body 24 with the flat surface 60 of the housing 40 engaging the inner surface 62 of an insulating cover 61 of the probe head 24. The coaxial cable 28 extends through the bore 46 in the housing 40 and is secured to a substrate 64 mounted in a metallic housing 66 within the probe head 24. The outer shielding conductor 68 of the coaxial cable 28 is soldered to a electrical contact pad 70 on the substrate 64 and the signal conductor 72 of the coaxial cable 28 soldered to a second electrical contact pad 74. Lateral flexing of the exposed portion of the coaxial cable 28 causes a portion of the cable extending out of the inverted strain relief 22 to lay against the curved surface 52 of the bore 46 which provides a smooth constant bend for the cable. Continued lateral flexing of the coaxial cable 28 causes a further portion of the cable to lay against the arcuate surface 58 of the housing 40. Since the arcs 53, 59 scribed by the first and second radii 54 and 56 are tangential, there is a smooth transition between the surfaces of the bore 46 and the arcuate surface 58 which provides a smooth bending surface for the cable.

The housing 40 is preferably formed of a solid, non-conductive material, such as ABS plastic, ABS-poly-carbonate blend or the like. Alternately, the housing 40 may be formed a solid, conductive material, such as brass, aluminum or the like, that is coated with a non-conductive material. The radii 54 and 56 of the inverted strain relief 22 are a function of the size, strength and sensitivity of the coaxial cable 28. A smaller, more sensitive coaxial cable requires larger radii as compared to a more sturdy cable that would require smaller radii. The present invention contemplates using a coaxial cable 28 having a diameter of 0.070 inches. For such a cable, the first radius of the inverted strain relief is 0.200 inches and the second radius is 0.062 inches. Other radii ratios may be employed for the inverted strain relief, such as "phi" $\phi$ which is equal to 1.618034.

Figure 5:
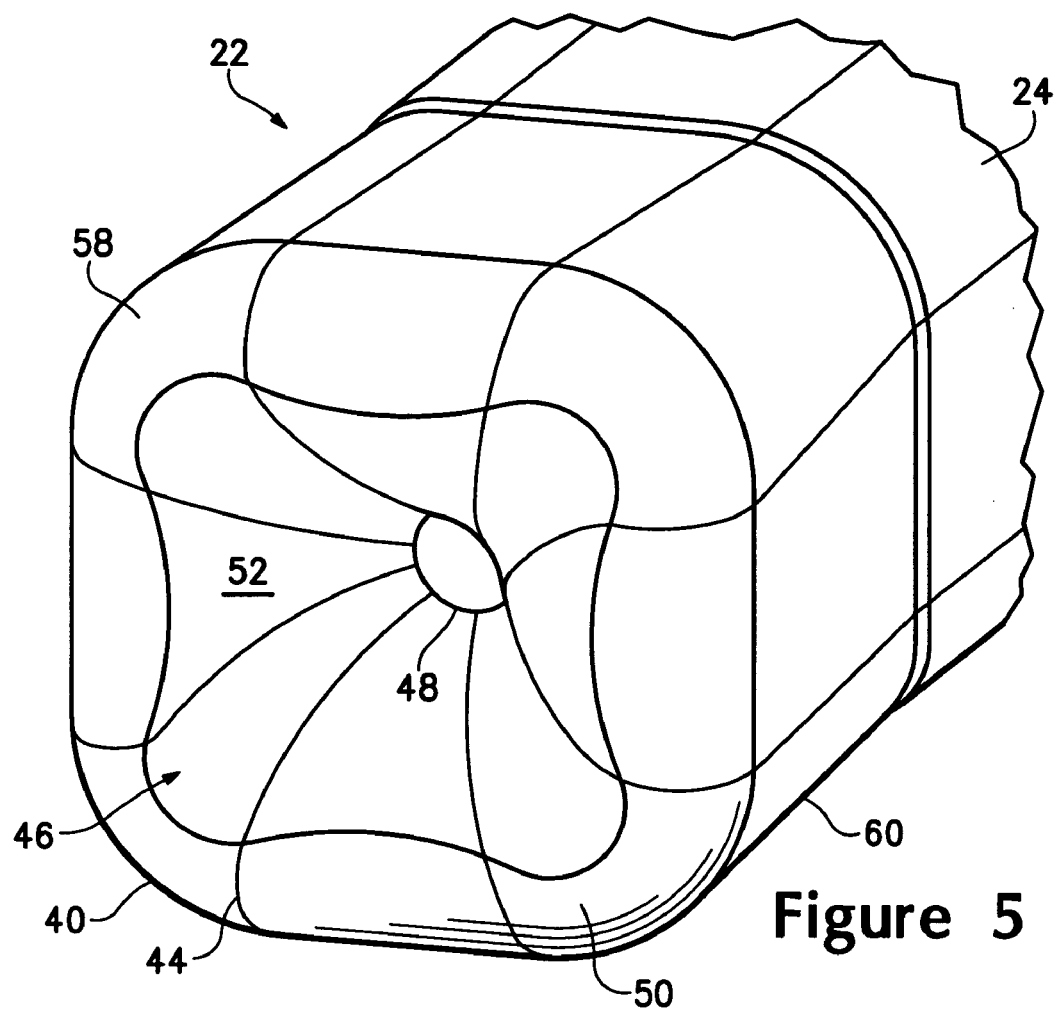
FIG. 5 is a perspective view illustrating a further embodiment of the inverted strain relief according to the present invention.
Figure 6:
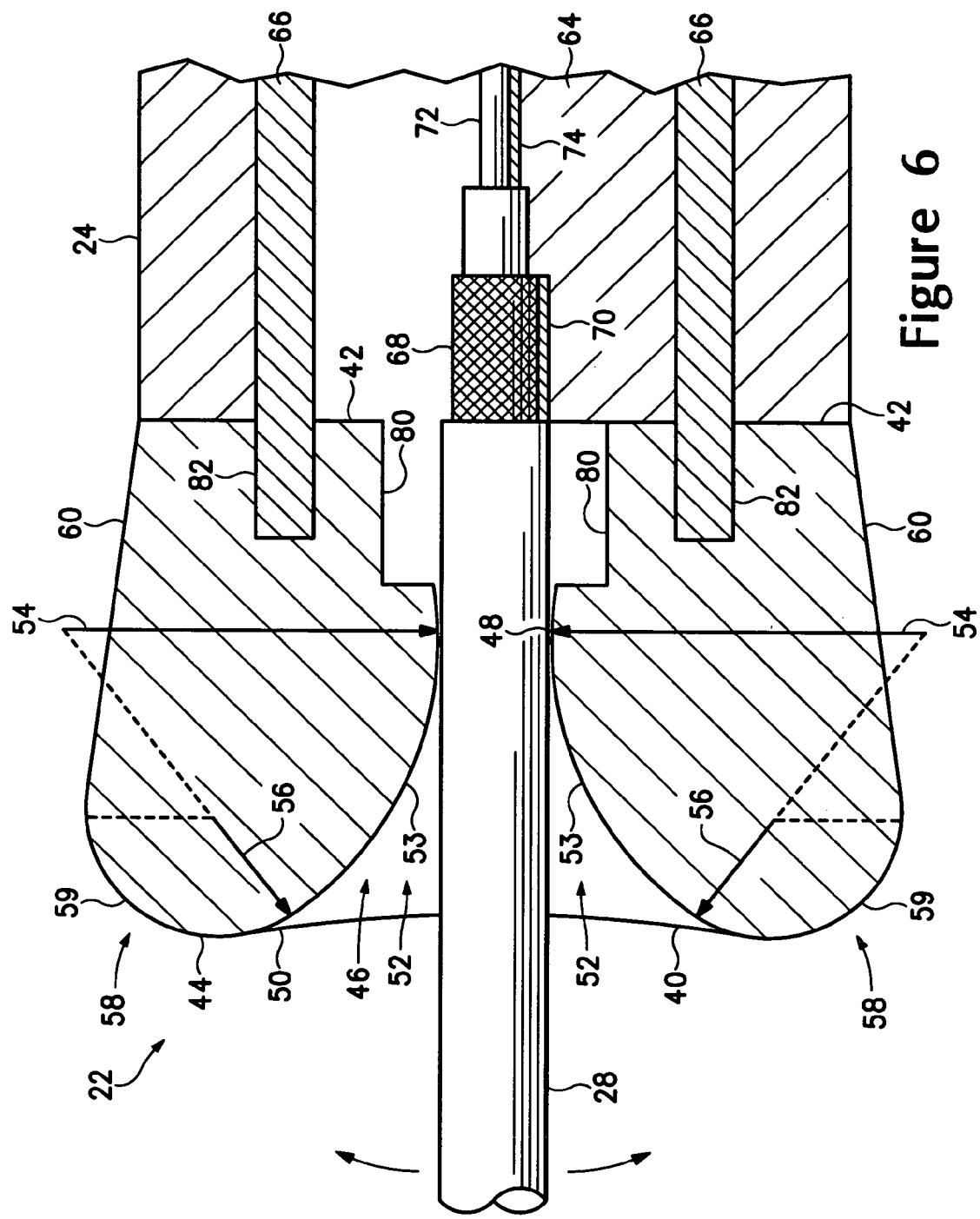
FIG. 6 is a sectional view of the inverted strain relief of FIG. 5.

Referring to FIGS. 5 and 6, there are show respective perspective and side sectional views of a further embodiment of the inverted strain relief 22. Like elements from the previous drawing are labeled the same. In the embodiment of FIGS. 5 and 6, the housing 40 has a substantially rectangular shape that conforms to the rectangular shape of the probe body 24. The flat exterior surface 60 of the housing 40 is substantially tangential to the arcuate surface 58. The housing surface 42 has a circumferential notch 80 around the aperture 48 and a channel 82 matching the shape of the metallic housing 66. A front portion of the metallic housing 66 is inserted into the channel 82 to secure the inverted strain relief housing 40 to the probe body 24 with the end of the insulating cover 61 of the probe body 24 abutting the housing surface 42.

The surface 52 of the bore 46 is defined by both the first and second radii 54 and 56. The first radius 54 subtends an arc 53 of approximately 60 to 80 degrees from the perimeter of the first aperture 48 due to the rectangular shape of the housing 40. The greatest arc is generated at the corners of the rectangular housing 40. The second radius 56 scribes an arc 59 that is tangential to the arc 53 scribed by the first radius 54. The arc 59 of the second radius 56 defines the bore surface 52 from the transition with the arc 53 of the first radius to surface 44 of the housing 40. The second radius 56 further defines the arcuate outer surface 58 portion of the housing 40 with the combined arcs 53,59 of the first and second radii 54 and 56 not exceeding 360 degrees.

FIG. 7 is a perspective view of a further embodiment of the inverted strain relief 22 of the present invention incorporated in a differential measurement probing system 20. Like elements from the previous drawing figures are labeled the same. The differential probing system 20 has a probe body 24 with the inverted strain relief housing 40 disposed at one end. First and second coaxial cables 84, 86 extend from the probe body 24 through the inverted strain relief 22. The free ends of the coaxial cables are coupled to a probing tip member 30.

Figure 9:
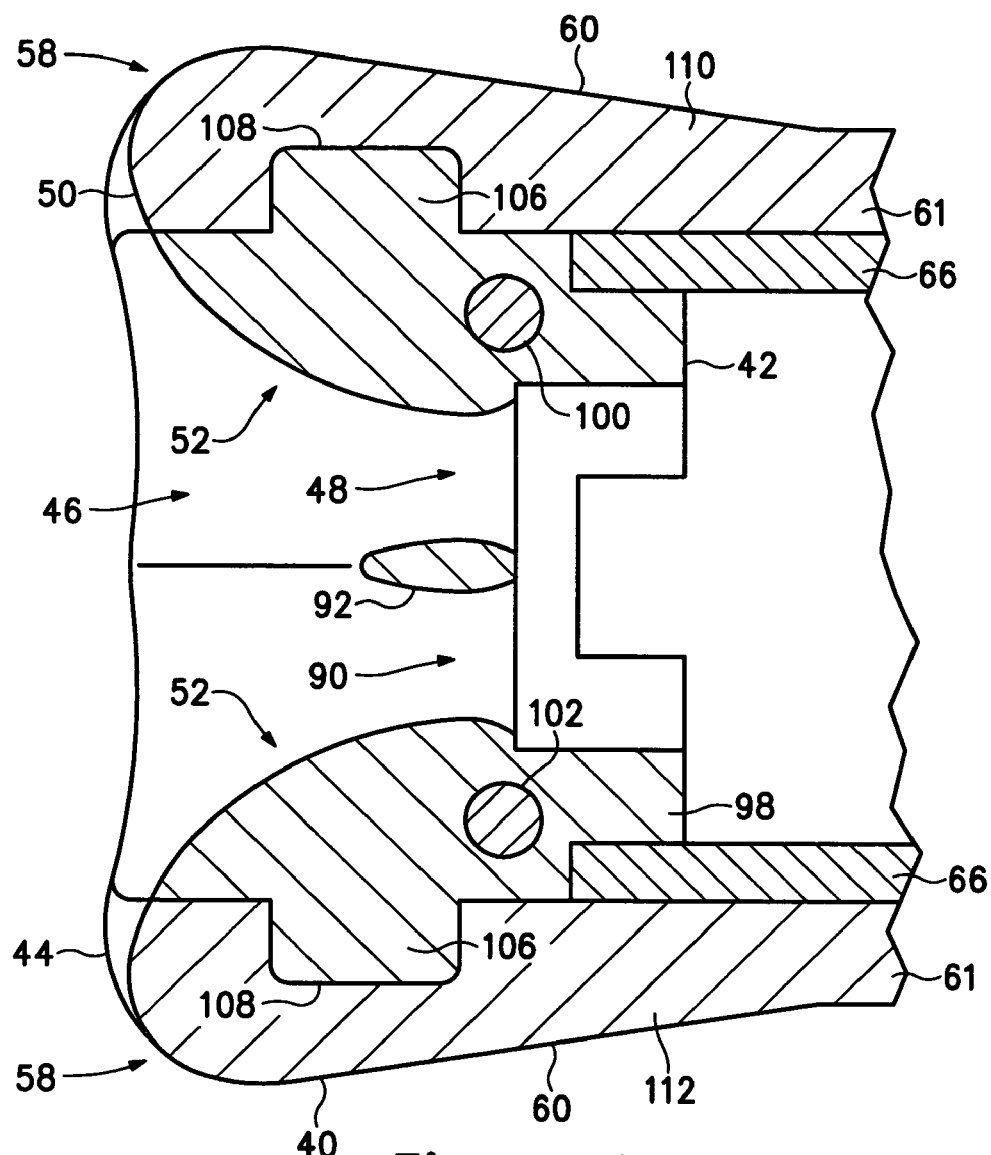
FIG. 9 is a sectional view of the inverted strain relief of FIG. 8.
Figure 10:
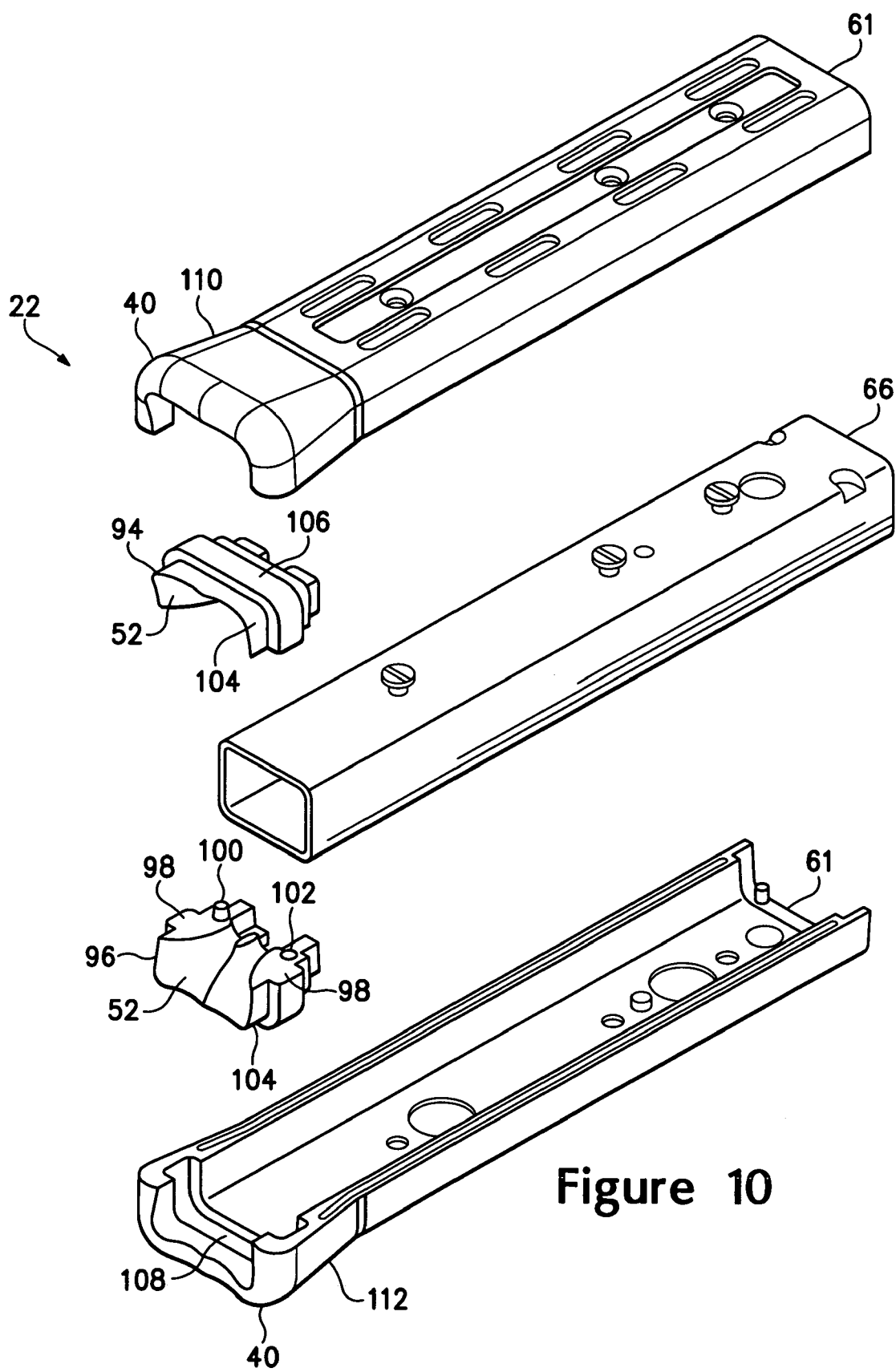
FIG. 10 is an exploded perspective view of the preferred elements forming the inverted strain relief according to the present invention.

FIGS. 8 and 9 show respective perspective and sectional views of the invented strain relief illustrated in FIG. 7. As in the embodiment of FIGS. 5 and 6, the housing 40 has a substantially rectangular shape with the flat surface 60 of the housing being substantially tangential to the arcuate surface 58. The housing 40 as depicted in FIG. 9 and shown in more detail in FIG. 10, is formed of four elements as described in greater detail below. The bore 46 of the housing 40 has a additional aperture 90 formed in the housing surface 42 adjacent to the aperture 48. The apertures 48, 90 are aligned laterally about a central point in the surface 42 of the housing 40 and separated by an arcuate intermediate bore surface 92. The surface of the bore 46 may be defined by the first radius 54 as illustrated in FIG. 4 or by the first and second radii 54 and 56 as illustrated in FIG. 6. The first radius 54 extends from circumference of the apertures 48, 90 defining the arcuate intermediate bore surface 92 between the apertures 48, 90.

The inverted strain relief 22 may be formed with a unitary housing 40 as depicted in the previously described embodiments. However, it is advantageous to form the inverted strain relief housing 40 from multiple parts for ease of manufacturing the measurement probing system 20. The coaxial cable 28 or cables 84, 86 are soldered to the substrate 64 and connected to the probing tip member 30 prior to the final assembly of the measurement probing system 20. The substrate 64 is secured in the metal tube 66 of the probing head 24 and them the insulating cover 61 of the probing head 24 that includes the inverted strain relief 22 is secured to the metallic tube 66. The elements of the inverted strain relief 22 designed for manufacturabilty are illustrated in FIG. 10. The inverted strain relief 22 has an inner portion formed of mirror imaged bore members 94, 96. The bore members 94, 96 are preferably formed of SANTOPRENE® or a similar type of material. The bore members 94, 96 have inner surfaces defined by the one or both of radii defining the bore surface 52. Extending to the rear and on either side of the bore surfaces 52 are flat surfaces 98. One of the flat surfaces 98 of each bore member 94, 96 has an upwardly extending protrusion 100 and the other flat surface 98 has a recess 102. The protrusions 100 and recesses are formed such that the protrusions 100 of the bore members 94, 96 are received in the recesses 102 of the bore members 94, 96.

The outer surfaces 104 of each bore member 94, 96 is formed with a rib 106 that is received in respective channels 108 formed in the outer housing members 110, 112 on the inverted strain relief 22. The outer housing members 110, 112 are integrally formed with the insulating cover 61 of the probe body 24 and are formed of an ABS-poly-carbonate blend injection moldable material or the like. The outer housing members 110, 112 include the rest of the bore surface 52 having an arc 53, 59 defined by either the first radius or both the first and second radii and the exterior arcuate surface of the inverted strain relief 22. The rear portion of the outer surfaces of each bore member 94, 96 is recessed to form a channel way 114 that receives the front portion of the metallic body 66.

The bore members 94, 96 are positioned in their respective outer housing members 110,112 forming the completed inverted strain relief 22. The outer housing member 110, 112 are brought together with the coaxial cables 84, 86 disposed in the apertures 48, 90 of the inverted strain relief 22. The outer housing members 110, 112 are then secured together to capture the bore member 94, 96 in the outer housing members 110, 112, the coaxial cables 84, 86 in the inverted strain relief 22 and the metallic housing 66 in the insulating cover 61 of the probing head 24.

An inverted strain relief 22 for coaxial cables has been described having a housing 40 with bore 46 therethrough that has a surface 52 defined by an arc 53 scribed by at least a first radius 54 extending from the perimeter of a first aperture 48. A second radius 56 that is smaller than the first scribes a second arc 59 tangential to the first arc that defined an arcuate outer surface 58 of the housing 40. The surface 52 of the bore 46 may also be defined by the arcs 53, 59 of the first and second radii 54, 56. The bore 46 may also include a second aperture 90 that is adjacent to the first aperture 48 for receiving coaxial cables 84, 86. The inverted strain relief 22 is preferably formed of bore members 94, 96 and outer housing members 110, 112 to allow for easy assembly of the measurement probing system 20 incorporating the inverted strain relief 22.

It will be obvious to those having skill in the art that many changes may be made to the details of the above-described embodiments of this invention without departing from the underlying principles thereof. The scope of the present invention should, therefore, be determined only by the following claims.

What is claimed is:

1. An inverted strain relief for receiving a coaxial cable comprising:

a housing having a bore therethrough intersecting opposing surfaces of the housing defining first and second apertures in the opposing surfaces with the bore having a surface being defined by a first and a second radii with the first radius being greater than the second radius and the first radius extending from the perimeter of the first aperture and scribing a first arc and the second radius scribing a second arc where the arc of the first radius is tangential to the arc of the second radius and wherein the surface of the bore provides the strain relief for the coaxial cable.

2. The inverted strain relief as recited in claim 1 wherein the housing is substantially circular and the arc scribed by the first radius is approximately sixty degrees.

3. The inverted strain relief as recited in claim 1 wherein the housing is substantially rectangular and the arc scribed by the first radius ranges from approximately sixty degrees to eighty degrees.

4. The inverted strain relief as recited in claim 1 wherein the housing further comprises an exterior surface wherein the second radius scribes a surface on the exterior surface extending from the second aperture where the total arc scribed by the first and second radii does not exceed 360 degrees and wherein the surfaces scribed by the first and second radii provide the strain relief for the coaxial cable.

5. The inverted strain relief as recited in claim 1 wherein the bore in the housing is defined by an additional aperture formed adjacent to the first aperture with the surface of the bore being defined by the first and second radii with the first radius extending from the perimeters of the additional aperture formed adjacent to the first aperture such the surface of the bore provides strain relief for coaxial cables extending through the bore and passing through the additional aperture formed adjacent to the first aperture.

6. The inverted strain relief as recited in claim 5 wherein the housing is substantially circular and the arc scribed by the first radius is approximately sixty degrees.

7. The inverted strain relief as recited in claim 5 wherein the housing is substantially rectangular and the arc scribed by the first radius ranges from approximately sixty degrees to eighty degrees.

8. The inverted strain relief as recited in claim 5 wherein the housing further comprises an exterior surface wherein the second radius scribes a surface on the exterior surface extending from the second aperture where the total arc scribed by the first and second radii does not exceed 360 degrees and wherein the surfaces scribed by the first and second radii provide the strain relief for the coaxial cables.

9. An inverted strain relief for receiving a coaxial cable comprising:

a housing having a bore therethrough intersecting opposing surfaces of the housing defining first and second apertures in the opposing surfaces with the bore having a surface being defined by a first radius scribing an arc extending from the perimeter of the first aperture to the perimeter of the second aperture and a second radius scribing an arc from the second aperture over an exterior surface of the housing where the arc of the first radius is tangential to the arc of the second radius with the total arc scribed by the first and second radii not exceeding 360 degrees and the surfaces scribed by the first and second radii provides the strain relief for the coaxial cable.

10. The inverted strain relief as recited in claim 9 wherein the bore in the housing is defined by an additional aperture formed adjacent to the first aperture with the surface of the bore being defined by first radius extending from the perimeters of the additional aperture formed adjacent to the first aperture such the surface of the bore provides strain relief for coaxial cables extending through the bore and passing through the additional aperture formed adjacent to the first aperture.

* * * * *